United States Patent [19]

Romance

[11] Patent Number: 5,006,604

[45] Date of Patent: Apr. 9, 1991

[54] ABS/COPOLYESTER BLENDS

[75] Inventor: Kenneth A. Romance, Kingsport, Tenn.

[73] Assignee: Eastman Kodak Company, Rochester, N.Y.

[21] Appl. No.: 405,405

[22] Filed: Sep. 11, 1989

Related U.S. Application Data

[63] Continuation of Ser. No. 211,948, Jun. 27, 1988, abandoned.

[51] Int. Cl.$^5$ ............................................. C08L 67/02
[52] U.S. Cl. ..................................... 525/173; 525/64; 525/175
[58] Field of Search .......................... 525/173, 175, 64

[56] References Cited

U.S. PATENT DOCUMENTS

| | | | |
|---|---|---|---|
| 3,564,077 | 2/1971 | Brinkmann et al. | 260/873 |
| 3,644,574 | 2/1972 | Jackson, Jr. et al. | 260/873 |
| 3,919,353 | 11/1975 | Casteinuovo et al. | 260/873 |
| 4,096,202 | 6/1978 | Farnham et al. | 260/873 |
| 4,117,034 | 9/1978 | Steffancin | 260/873 |
| 4,352,907 | 10/1982 | Lee | 524/537 |
| 4,582,876 | 4/1986 | Weemes et al. | 525/64 |

FOREIGN PATENT DOCUMENTS 3332325 3/1985 Fed. Rep. of Germany .
53-71155 6/1978 Japan .

*Primary Examiner*—Patricia Short
*Attorney, Agent, or Firm*—John F. Stevens; William P. Heath, Jr.

[57] ABSTRACT

A blend of a terephthalic acid/ethylene glycol/cyclohexanedimethanol copolyester and an acrylonitrile/butadiene/styrene copolymer is disclosed. This blend possesses high notched Izod impact strength while maintaining a good balance of flexural modulus properties, tensile properties, heat diffusion temperature properties and hardness properties. This blend is useful in making automotive and appliance components.

6 Claims, 3 Drawing Sheets

ABS/COPOLYESTER BLENDS

This is a continuation of application Ser. No. 07/211,948 filed on June 27, 1988, now abandoned.

BACKGROUND OF THE INVENTION

1. Field of the Invention

The present invention relates to blends of acrylonitrile/butadiene/styrene copolymers (ABS) with certain copolyesters. These blends have been found to have an unexpectedly good balance of physical properties.

2. Discussion of the Background

Art of interest in connection with this invention includes U.S. Pat. No. 3,644,574, which discloses blends of poly(tetramethylene terephthalate) with polystyrene or with copolymers having a styrene content greater than 50%.

U.S. Pat. No. 3,564,077 discloses that the impact properties of poly(ethylene terephthalate) can be moderately improved by blending the poly(ethylene terephthalate) with small amounts, generally less than 10% by weight of a styrene-butadiene copolymer.

U.S. Pat. No. 4,117,034 discloses that the addition of certain graft polymers to amorphous aromatic polyesters of aliphatic diols provides an improvement in the impact strength characteristics and a concomitant reduction in the notch sensitivity of the composition. The polyesters disclosed by U.S. Pat. No. 4,117,034 can be amorphous polyesters derived from aromatic dicarboxylic acids and aliphatic diols, e.g., the phthalate copolyesters of aliphatic diols having three or more carbon atoms, such as copoly(1,4-cyclohexalene dimethylene iso/terephthalate) and the like.

U.S. Pat. No. 4,096,202 discloses that impact modifiers for poly(alkylene terephthalates) based on rubbers of polybutadiene, butadiene-styrene copolymers, butadiene-acrylonitrile copolymers, ethylene-propylene rubbers, polyisobutene and polyisoprene have been suggested, making reference to U.S. Pat. No. 3,919,353.

U.S. Pat. No. 4,496,202 also discloses blends of about 99% to 60% by weight of a poly(alkylene terephthalate) and about 1% to 40% by weight of a multi-phase composite interpolymer. The multi-phase composite interpolymer is made up of about 25 to 95 weight % of a first elastomeric phase polymerized from a monomer system, and about 75% to 5% by weight of a final, rigid thermoplastic phase form of epoxy groups polymerized in the presence of the elastomeric phase. The monomer system is made up of about 75% to 99.8% by weight of a $C_{1-6}$ alkyl acrylate, 0.1% to 5% by weight of a cross-linking monomer, and 0.1% to 5% by weight of a graft linking monomer. This blend is said to provide an impact modified poly(alkylene terephthalate) without significantly increasing melt viscosity.

DE No. 33 32 325 discloses blends of acrylonitrile/butadiene/styrene copolymers with polycarbonate. JP No. 53-71155 discloses three component blends of aromatic polyesters, acrylonitrile/butadiene/styrene copolymers and polycarbonate.

The present invention provides blends of ABS copolymers with certain copolyesters which possess a high notched Izod impact strength combined with a good balance of other properties, i.e., flexural modulus, tensile properties, heat deflection temperature, and hardness. These blends are useful in making automotive and appliance components.

BRIEF DESCRIPTION OF THE FIGURES

A more complete appreciation of this invention and many of its attendant advantages will be readily obtained as the same becomes better understood by reference to the following detailed description when considered in connection with the accompanying figures, wherein.

DETAILED DESCRIPTION OF THE PREFERRED EMBODIMENT

The composition of the present invention is a blend of a copolyester component and an ABS copolymer component. The copolyester can be present in an amount of from 5% by weight to 95% by weight, and the copolymer can be present in an amount of from 95% by weight to 5% by weight, both weights being based on the combined weights of ABS and copolyester.

The copolyester component comprises repeating units from terephthalic acid, ethylene glycol, and cyclohexanedimethanol. This copolyester is made up of repeating units from an acid component of terephthalic acid and a glycol component of repeating units from about 85 to 10 mol % ethylene glycol, and about 15 to 90 mol % cyclohexanedimethanol.

As used herein, the term "terephthalic acid" includes substituted terephthalic acid such as 2-methyl-, 2-chloro-, 2,5-dimethyl-, or 2,5-dichloroterephthalic acid. The terephthalic acid portion also may be replaced with up to 20 mol % of other conventional aromatic dicarboxylic acids, such as 2,6-naphthalenedicarboxylic acid, 4,4'-biphenyldicarboxylic acid, or isophthalic acid, or with aliphatic dicarboxylic acids containing 5-20 carbon atoms, such as glutaric, adipic, pimelic, suberic, azelaic, sebacic, cyclohexanedicarboxylic or dodecanedicarboxylic acids. Essentially 100 mol % terephthalic acid is preferred.

The ethylene glycol and cyclohexanedimethanol may be replaced with up to about 20 mol % of other aliphatic glycols, containing 2 to 10 carbon atoms such as ethylene glycol, 1,3-propanediol, neopentyl glycol, 1,4-butanediol, 1,5-pentanediol or 1,6-hexanediol.

For many of these blends, the highest notched Izod impact strength characteristics are observed with copolyester containing repeat units from about 40 to 90 mol % cyclohexanedimethanol.

Generally the highest notched Izod impact strength characteristics are observed for compositions containing at least 50% by weight of the copolyester.

In a preferred embodiment of this invention, the copolyester component has an inherent viscosity of from about 0.5 to 1.0, preferably this inherent viscosity is from about 0.7 to 0.8.

In another preferred embodiment, the cyclohexanedimethanol component is a cis-/trans-mixture of 1,4-cyclohexanedimethanol.

In another preferred embodiment of this invention, the acrylonitrile/butadiene/styrene copolymer has a notched Izod impact strength of at least 2.5 ft-lb/in at 23° C. The ABS copolymers useful in this invention may have repeat units from the respective monomers in the following ranges:

acrylonitrile—about 15% to 30%
butadiene—about 6% to 30% styrene—about 40% to 80%

Figure 1:
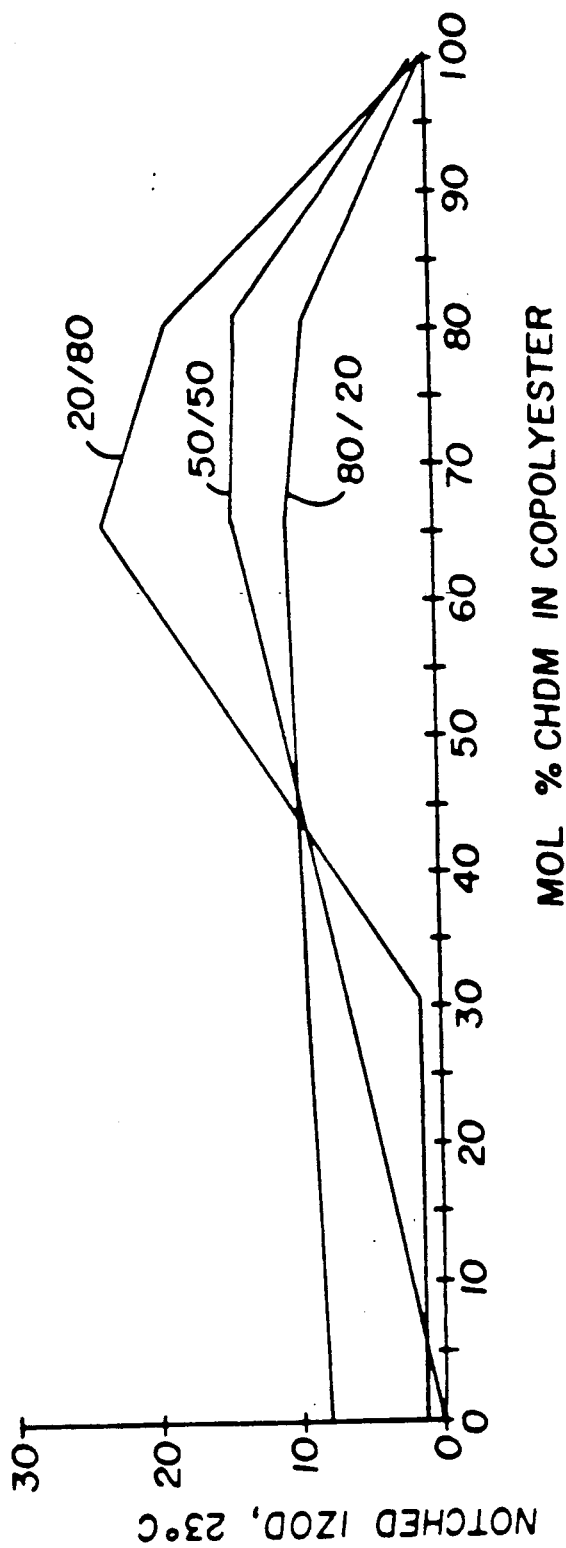
FIGS. 1, 2 and 3 graph the notched Izod strength at 23° C. of various blends provided by the present invention as a function of the cyclohexanedimethanol content of the copolyester used in the blend.

Cycolac L is an acrylonitrile/butadiene/styrene copolymer (repeat unit weight percents of about 23, 27, and 50 respectively) having a notched Izod impact strength of 9.9 ft-lb/in and is represented in FIG. 1 as "ABS Copolymer A." As illustrated in FIG. 1, the highest Izod impact strength characteristic were observed for 20/80 ABS Copolymer A/polyester blends. For these blends, a notable increase in the notched Izod impact strength of the blend is observed at a 30% cyclohexanedimethanol content. The notched Izod impact strength of the blend increases as a function of the percentage of cyclohexanedimethanol in the copolyester to reach a maximum at a value of 65 mol % cyclohexanedimethanol, whereinafter the notched Izod impact strength characteristic of the blend decreased.

A 50/50 ABS Copolymer A/polyester blend behaves similarly, displaying a maximum notched Izod impact strength in the region of from 65 to 80 mol % cyclohexanedimethanol. The increase of the notched Izod impact strength of this blend is essentially continuous up to a 60% content of cyclohexanedimethanol, at which point the notched Izod impact strength levels to a value of about 80% cyclohexanedimethanol, whereinafter a decrease in notched Izod impact strength was noted.

An 80/20 ABS Copolymer A/polyester blend displays a more consistent notched Izod impact strength for values of up to approximately 65% cyclohexanedimethanol. With increasing content of cyclohexanedimethanol, the notched Izod impact strength of this blend decreases gently from 65 mol % cyclohexanedimethanol to a value of about 80 mol % cyclohexanedimethanol, whereupon it decreases more steadily.

Figure 2:
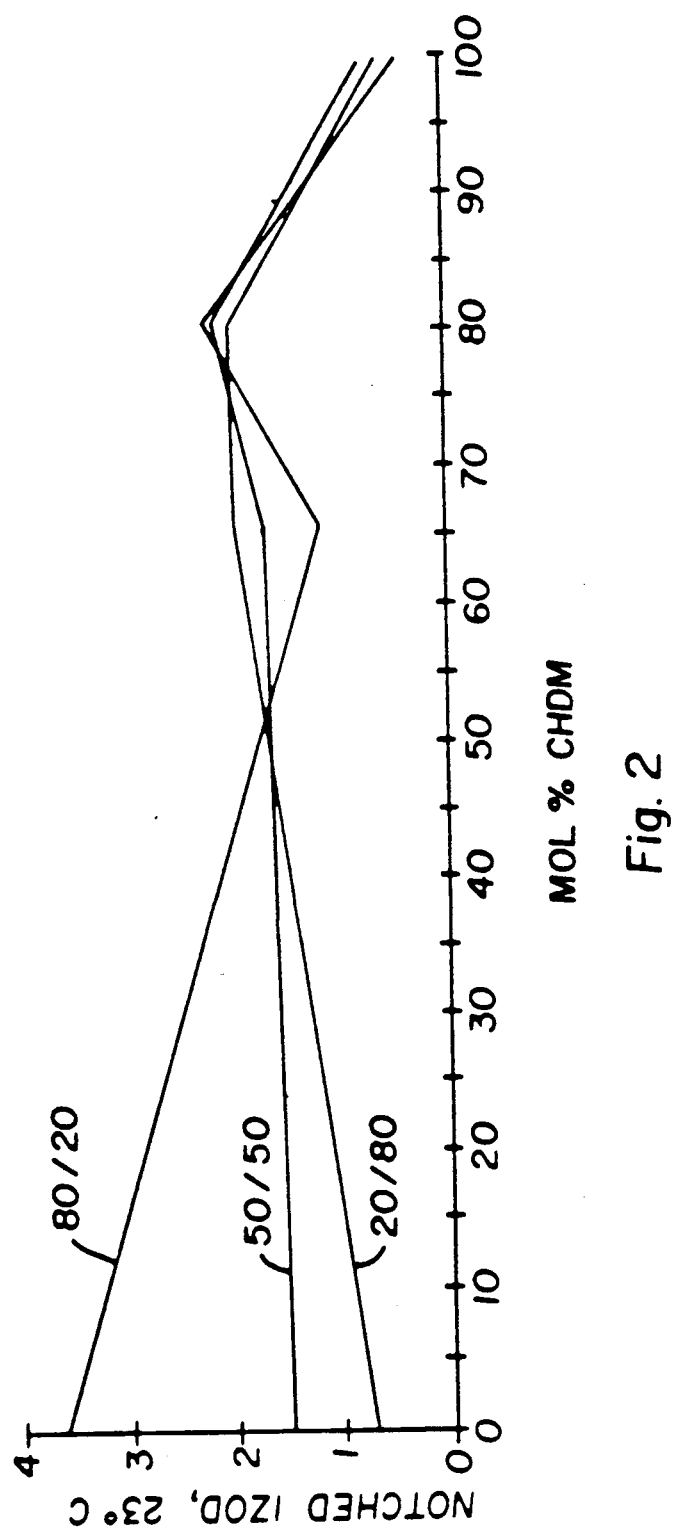

FIG. 2 shows a different trend in the notched Izod impact strength of compositions provided by the present invention. FIG. 2 illustrates the notched Izod impact strength of Cycolac T/polyester compositions as a function of cyclohexanedimethanol content in the copolyester. Cycolac T is an acrylonitrile/butadiene/styrene copolymer (repeat unit weight percents of about 27, 20, and 53 respectively) having a notched Izod characteristic of 6.7 ft-lb/in and is represented in FIG. 2 as ABS Copolyester B.

For these compositions, the highest notched Izod impact strength characteristics are displayed by an 80/20 ABS/copolyester blend at low cyclohexanedimethanol content. For this 80/20 blend, the notched Izod impact strength characteristic of the composition decreases continuously as a function of cyclohexanedimethanol content to reach a minimum value at 65 mol % cyclohexanedimethanol content, whereupon the notched Izod impact strength characteristics of the composition increases to reach a second maximum at 81 mol % cyclohexanedimethanol, whereupon the notched Izod impact strength characteristics again decreases.

By contrast, two other blends tested, a 50/50 ABS/copolyester blend and a 20/80 ABS/copolyester blend, both display an increase in notched Izod impact strength characteristics as a function of increasing cyclohexanedimethanol content. Both of these compositions display a maximum notched Izod impact strength at concentrations of from 65% to 85% cyclohexanedimethanol, whereupon the notched Izod impact strength characteristics decrease.

Figure 3:
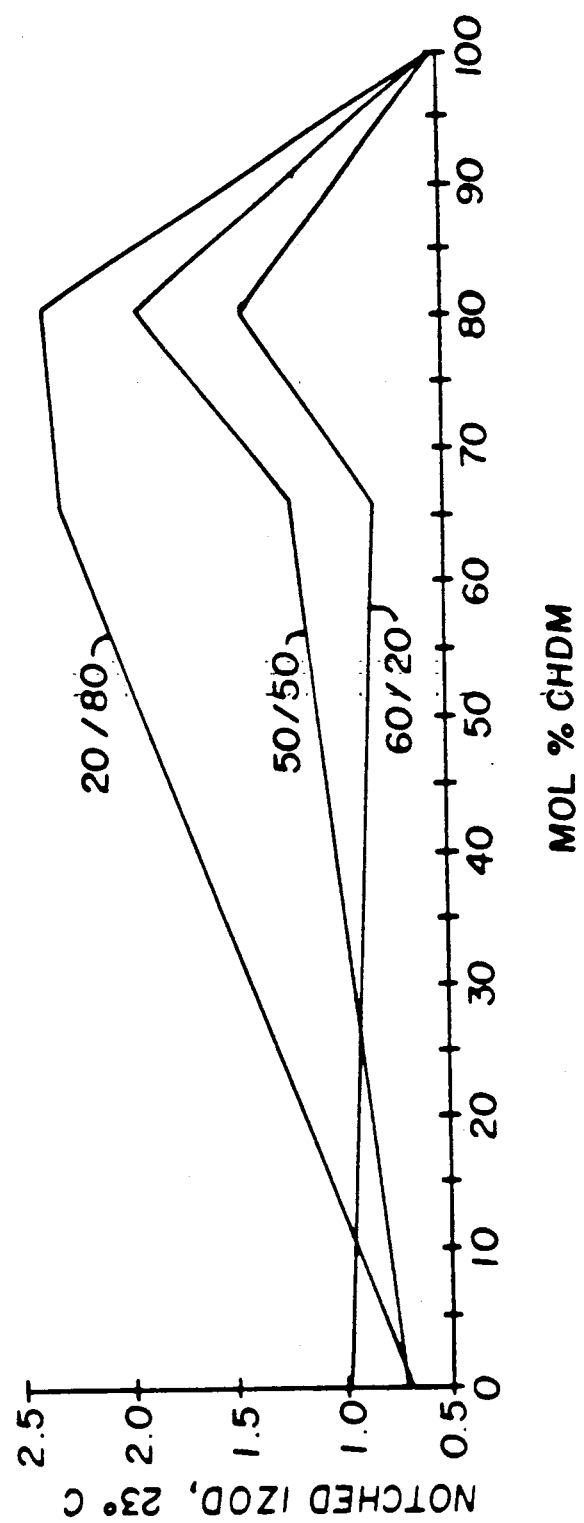

FIG. 3 provides the notched Izod impact strength for Cycolac DFA-R/polyester blends as a function of cyclohexanedimethanol content. Cycolac DFA-R is an acrylonitrile/butadiene/styrene copolymer (repeat unit weight percents of about 25, 13, and 62 respectively) material having a notched Izod characteristic of 2.6 ft-lb/in and is represented in FIG. 3 or ABS Copolymer C. For these compositions, a 20/80 ABS/copolyester blend displays the highest notched Izod impact strength characteristics. These characteristics increase as a function of cyclohexanedimethanol content to reach a maximum in the range of 65 to 85 mol % cyclohexanedimethanol, whereupon the notched Izod impact strength characteristics decrease. Two other blends tested, a 50/50 ABS/copolyester blend and a 20/80 ABS/copolyester blend, display maximal notched Izod impact strength characteristics in the neighborhood of 80 mol % cyclohexanedimethanol.

Other features of this invention will become apparent in the course of the following descriptions of exemplary embodiments which are given for illustration of the invention and are not intended to be limiting thereof.

EXAMPLE 1

Blends of 80%, 50%, and 20% Cycolac L ABS (notched Izod of 9.9 ft-lb/in.) with 20%, 50%, and 80%, respectively, of each of PCT (a terephthalic acid/cyclohexanedimethanol polyester), Copolyester R (a terephthalic acid/cyclohexanedimethanol/ethylene glycol polyester from terephthalic acid, about 75–85 mol % cyclohexanemethanol, and about 15–25 mol % ethylene glycol), Copolyester S (a terephthalic acid cyclohexanedimethanol/ethylene glycol polyester from terephthalic acid, about 60–70 mol % cyclohexanedimethanol, and about 30–40 mol % ethylene glycol), Copolyester T (a terephthalic acid/cyclohexanedimethanol/ethylene glycol polyester from terephthalic acid, about 65–75 mol % cyclohexanedimethanol, and about 25–35 mol % ethylene glycol) and PET (a terephthalic acid/ethylene glycol polyester) were prepared. These blends are dried and melt compounded on a 1.5 inch single screw MPM extruder and chopped into pellets (conditions are provided in Table I). The samples are redried and molded on a 175 ton New Britain injection molding machine (conditions in Table I). Upon review of the data, an unusual trend is seen. Surprisingly, the notched Izod strength at 23° C. of the blends over a certain range of mol % CHDM (about 15% to about 90%) in the copolyesters is seen to be increased over blends made with the homopolymers PCT and PET or with low levels of ABS (see FIG. I).

EXAMPLE 2

Blends using Cycolac T ABS (notched Izod of 6.7 ft-lb/in.) are made as in Example 1. Again, the notched Izod impact strength at 23° C. of the blends made with the copolyesters containing about 15 to about 90 mol % CHDM is unexpectedly greater than those made with the homopolymers PCT and PET or with low levels of ABS (see FIG. II).

EXAMPLE 3

Blends using Cycloac DFA-R (notched Izod of 2.6 ft-lb/in.) are made following the procedure used in Example 1. The notched Izod impact strength at 23° C. of the blends over the same range of mol % CHDM in the copolyester is again surprisingly greater than those made with the homopolymers PCT and PET or with low levels of ABS (see FIG. III).

TABLE I

| | Copolyester | | | | |
|---|---|---|---|---|---|
| | PCT | R | S | T | PET |
| % CHDM | 100 | 81 | 66 | 31 | 0 |
| Extrusion with ABS | | | | | |
| Drying Temp (C) | 90 | 90 | 90 | 90 | 90 |
| Drying Time (hr) | 16 | 16 | 16 | 16 | 16 |
| Extrusion Temp (C) | 270 | 250 | 250 | 250 | 260 |
| Molding with ABS | | | | | |
| Drying Temp (C) | 90 | 90 | 90 | 90 | 90 |
| Drying Time (hr) | 16 | 16 | 16 | 16 | 16 |
| Temp (°C.) | 270 | 250 | 250 | 250 | 260 |
| Mold Temp (°C.) | 23 | 23 | 23 | 23 | 23 |

As used herein, the inherent viscosity (I.V.) is measured at 25° C. using 0.50 gram of polymer per 100 mL of a solvent consisting of 60% by weight phenol and 40% by weight tetrachloroethane.

Izod impact strengths are determined according to ASTM D256.

Obviously, numerous modifications and variations of the present invention are possible in light of the above teachings. It is therefore to be understood that within the scope of the appended claims, the invention may be practiced otherwise than as specifically described herein.

I claim:

1. A composition of matter characterized by having improved impact strength and improved balance of physical properties comprising
   a. about 50–95% by weight of a copolyester having repeat units from an acid component consisting essentially of terephthalic acid and a glycol component comprising repeat units from about 60 to 10 mol % ethylene glycol and about 40 to 90 mol % cyclohexanedimethanol, and
   b. about 50–5% by weight of a copolymer of about 15–30 wt % acrylonitrile, about 6–30 wt % butadiene and about 40–80 wt % styrene.

2. The composition of claim 1, wherein said copolymer has a notched Izod impact strength of at least 2.5 ft-lb/in at 23° C.

3. The composition of claim 1, wherein said copolyester has an inherent viscosity of from 0.5 to 1.0.

4. The composition of claim 1, wherein said copolyester has an inherent viscosity of from 0.7 to 0.8.

5. The composition of claim 1, wherein said cyclohexanedimethanol is a cis-/trans-mixture of 1,4-cyclohexanedimethanol.

6. An injection molded article made of a blend according to claim 1.

* * * * *